United States Patent
Jing et al.

(10) Patent No.: US 12,504,629 B2
(45) Date of Patent: Dec. 23, 2025

(54) OPTICAL MODULE, ELECTRONIC DEVICE, AND GLASSES

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Haoran Jing, Beijing (CN); Zhiyu Sun, Beijing (CN); Zhanshan Ma, Beijing (CN); Wenhong Tian, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 804 days.

(21) Appl. No.: 17/788,515

(22) PCT Filed: May 13, 2021

(86) PCT No.: PCT/CN2021/093631
§ 371 (c)(1),
(2) Date: Jun. 23, 2022

(87) PCT Pub. No.: WO2021/258904
PCT Pub. Date: Dec. 30, 2021

(65) Prior Publication Data
US 2023/0034002 A1 Feb. 2, 2023

(30) Foreign Application Priority Data
Jun. 23, 2020 (CN) .......................... 202010583158.1

(51) Int. Cl.
G02B 27/01 (2006.01)
G02B 7/02 (2021.01)

(52) U.S. Cl.
CPC ......... *G02B 27/0172* (2013.01); *G02B 7/021* (2013.01); *G02B 2027/0178* (2013.01)

(58) Field of Classification Search
CPC ................ G02B 27/0172; G02B 7/021; G02B 2027/0178; G02B 2027/0161; G02B 7/025; G02B 27/0176; G02B 7/022
See application file for complete search history.

(56) References Cited

U.S. PATENT DOCUMENTS

2012/0200787 A1* 8/2012 Fujishiro ............ G02B 27/0176
349/5
2014/0268336 A1* 9/2014 Hiraide .............. G02B 27/0172
359/507
(Continued)

FOREIGN PATENT DOCUMENTS

CN 201804150 U 4/2011
CN 104049365 A 9/2014
(Continued)

OTHER PUBLICATIONS

The First Office Action of Chinese patent application No. 202010583158.1 issued by the Chinese Patent Office on Oct. 13, 2021.
(Continued)

*Primary Examiner* — Charles S Chang
(74) *Attorney, Agent, or Firm* — XSENSUS LLP

(57) ABSTRACT

An optical module includes a lens barrel main housing, at least one dimming lens installed in the lens barrel main housing, a first cover assembly and a second cover assembly. Opposite ends of the lens barrel main housing are provided with a first opening and a second opening. The inner circumferential wall of the lens barrel main housing is
(Continued)

provided with at least one limiting portion. Each dimming lens abuts against a limiting portion in the preset direction. The first cover assembly is arranged on the first opening and includes a light source configured to emit image beams to the at least one dimming lens. The second cover assembly is arranged on the second opening and includes a transparent component being capable of transmitting the image beams passing through the at least one dimming lens to an outside of the lens barrel main housing.

18 Claims, 10 Drawing Sheets

(56) References Cited

U.S. PATENT DOCUMENTS

| | | | |
|---|---|---|---|
| 2014/0327603 | A1 | 11/2014 | Hiraide |
| 2016/0282627 | A1 | 9/2016 | Hiraide |
| 2018/0113318 | A1 | 4/2018 | Hiraide |
| 2020/0195823 | A1* | 6/2020 | Furutake ............ G03B 17/04 |
| 2022/0146777 | A1* | 5/2022 | Inaba ............... G02B 7/025 |
| 2022/0171207 | A1 | 6/2022 | Zhang et al. |

FOREIGN PATENT DOCUMENTS

| | | |
|---|---|---|
| CN | 204595401 U | 8/2015 |
| CN | 106019585 A | 10/2016 |
| CN | 206906682 U | 1/2018 |
| CN | 207676047 U | 7/2018 |
| CN | 110505380 A | 11/2019 |
| CN | 111610633 A | 9/2020 |
| IN | 104133294 A | 11/2014 |
| JP | 2008216686 A | 9/2008 |
| JP | 2020106730 A | 7/2020 |

OTHER PUBLICATIONS

The Second Office Action of Chinese patent application No. 202010583158.1 issued by the Chinese Patent Office on Mar. 11, 2022.

The Decision of Rejection of Chinese patent application No. 202010583158.1 issued by the Chinese Patent Office on Jul. 6, 2022.

* cited by examiner

OPTICAL MODULE, ELECTRONIC DEVICE, AND GLASSES

CROSS-REFERENCE TO RELATED APPLICATIONS

This application is a national phase entry under 35 USC 371 of International Patent Application No. PCT/CN2021/093631, filed on May 13, 2021, which claims priority to Chinese Patent Application No. 202010583158.1, filed on Jun. 23, 2020, which are incorporated herein by reference in their entirety.

TECHNICAL FIELD

Embodiments of the present disclosure relate to an optical module, an electronic device, and glasses.

BACKGROUND

With the development of technologies, more and more different types of electronic devices appear in people's life. Virtual reality (VR) glasses and augmented reality (AR) glasses have received extensive attention due to their properties such as convenient wearing and strong practicability.

SUMMARY

In an aspect, an optical model is provided. The display module includes a lens barrel main housing, at least one dimming lens, a first cover assembly and a second cover assembly. Opposite ends of the lens barrel main housing are respectively provided with a first opening and a second opening therein; an inner circumferential wall of the lens barrel main housing is provided thereon with at least one limiting portion arranged in a preset direction, the preset direction pointing from one of the first opening and the second opening to another of the first opening and the second opening. The at least one dimming lens is installed in the lens barrel main housing; each dimming lens abuts against a respective limiting portion in the preset direction, so that each limiting portion prevents a respective dimming lens from moving toward one of the first opening and the second opening. The first cover assembly is disposed on the first opening; the first cover assembly includes a light source, and the light source is configured to emit image beams to the at least one dimming lens. The second cover assembly is disposed on the second opening; the second cover assembly includes a transparent component, and the transparent component is capable of transmitting the image beams passing through the at least one dimming lens to an outside of the lens barrel main housing.

In some embodiments, the at least one limiting portion includes a plurality of limiting portions, and the plurality of limiting portions are arranged at intervals in sequence in the preset direction.

In some embodiments, the optical module further includes at least one first adhesive disposed between a dimming lens and a respective limiting portion that are abutted against each other.

In some embodiments, the first cover assembly further includes a back cover and a hollow tubular body. A first end of the tubular body includes a first portion embedded in the first opening and a second portion abutting against an end surface of the lens barrel main housing at a position of the first opening. An inner side of a second end of the tubular body is provided with a light source installation position for installing the light source, and the light source is installed in the light source installation position. The back cover is connected to the second end of the tubular body, so that the light source is fixed between the back cover and the tubular body.

In some embodiments, the light source installation position is in a stepped shape.

In some embodiments, the back cover includes: a back cover body, two first extension portions extending respectively from opposite ends of the back cover body toward the light source in a direction perpendicular to the back cover body, and two second extension portions each extending from an end of a first extension portion away from the back cover body toward another first extension portion. Positioning grooves are provided among a second extension portion, a first extension portion and the back cover body that are connected, and opposite ends of the second end of the tubular body are each located in a positioning groove.

In some embodiments, the optical module further includes at least one of: a second adhesive disposed between the tubular body and the lens barrel main housing; at least one third adhesive disposed between the tubular body and the back cover; or at least one fourth adhesive disposed between the tubular body and the light source.

In some embodiments, the first cover assembly further includes a first fixing plate disposed on an outer surface of the tubular body, the first fixing plate is provided with a first fixing hole therein.

In some embodiments, the second cover assembly further includes a hollow frame body. The frame body includes a third portion embedded in the second opening and a fourth portion abutting against another end surface of the lens barrel main housing at a position of the second opening. A positioning slide groove is provided in an inner side of the fourth portion, and at least one end of the positioning slide groove in a sliding direction is provided with a third opening therein. The transparent component is disposed in the positioning slide groove.

In some embodiments, the optical module further includes: at least one fifth adhesive disposed between the frame body and the lens barrel main housing; and/or at least one sixth adhesive disposed between the transparent component and the positioning slide groove.

In some embodiments, the at least one limiting portion includes a first limiting surface, a second limiting surface and a third limiting surface that are away from the first opening in sequence. The first limiting surface is exposed by the first opening, and the second limiting surface and the third limiting surface are exposed by the second opening. The at least one dimming lens includes a first dimming lens, a second dimming lens and a third dimming lens. An edge of the first dimming lens is provided thereon with a first limiting flange abutting against the first limiting surface, an edge of the second dimming lens is provided thereon with a second limiting flange abutting against the second limiting surface, and an edge of the third dimming lens is provided thereon with a third limiting flange abutting against the third limiting surface.

In some embodiments, the first dimming lens is a biconvex lens; and/or the second dimming lens is a meniscus lens, a concave surface of the second dimming lens facing the first opening, and a convex surface of the second dimming lens facing the second opening; and/or the third dimming lens is another biconvex lens.

In some embodiments, the optical module further includes a second fixing plate disposed on an outer surface of the lens barrel main housing, the second fixing plate is provided with a second fixing hole therein.

In some embodiments, the optical module further includes an optical waveguide display lens. A side surface of the optical waveguide display lens abuts against the transparent component, so that the image beams enter the optical waveguide display lens from the side surface of the optical waveguide display lens.

In some embodiments, the optical module further includes a seventh adhesive disposed between the optical waveguide display lens and the transparent component.

In some embodiments, the light source includes a display device or a projection device.

In another aspect, an electronic device is provided. The electronic device includes at least one optical module according to any of the above embodiments.

In yet another aspect, glasses are provided. The glasses include a support structure and at least one optical module according to any of the above embodiments, the optical module is installed on the support structure.

In some embodiments, the support structure includes: a glasses frame body and at least one glasses frame upper cover that match with each other, at least one receiving space for accommodating an optical module are defined between the glasses frame body and a glasses frame upper cover; and a wearing bracket connected to the glasses frame body.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal involved in the embodiments of the present disclosure.

DETAILED DESCRIPTION

Figure 1:
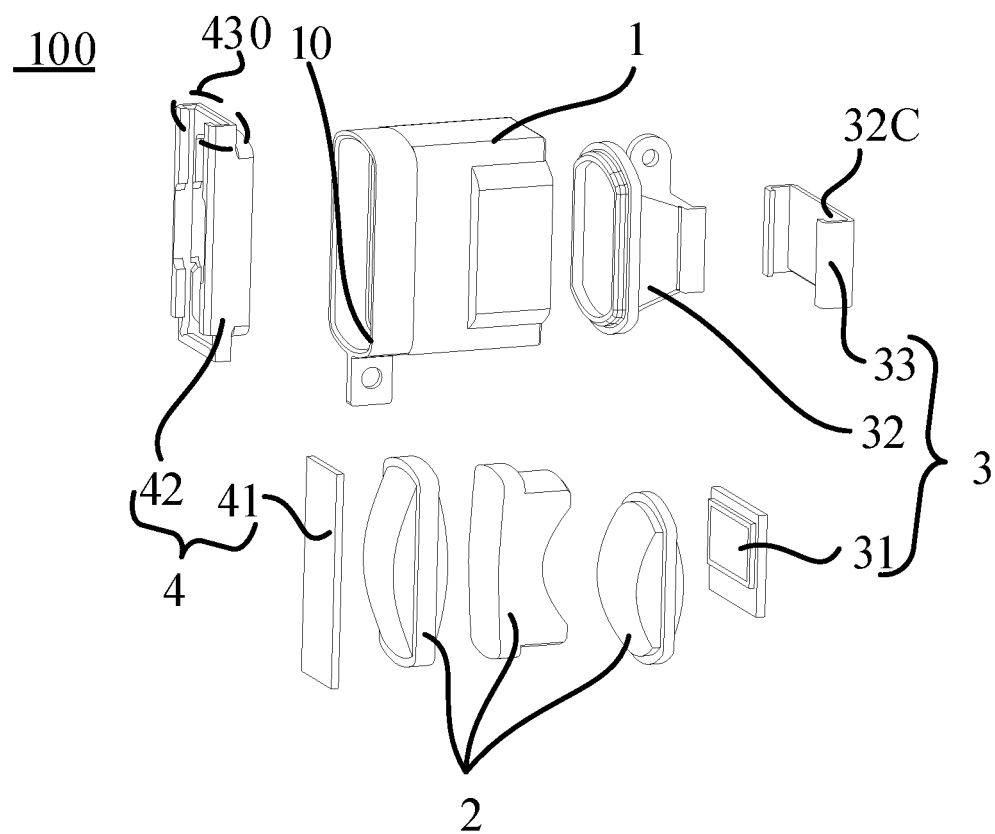
FIG. 1 is a schematic diagram of an optical module in a disassembled state, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive sense, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying relative importance or implicitly indicating the number of indicated technical features. Thus, features defined by "first" or "second" may explicitly or implicitly include one or more of the features. In the description of the embodiments of the present disclosure, terms "a plurality of" "the plurality of" and "multiple" each mean two or more unless otherwise specified.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The usage of the phrase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or value exceeding those stated.

In some embodiments, an optical module in an electronic device such as augmented reality (AR) glasses has a relatively complex structure, so that it is difficult to assemble the optical module, and the assembled optical module has a relatively large volume and weight, which in turn leads to the electronic device such as the AR glasses having a relatively large volume and weight.

Figure 2:
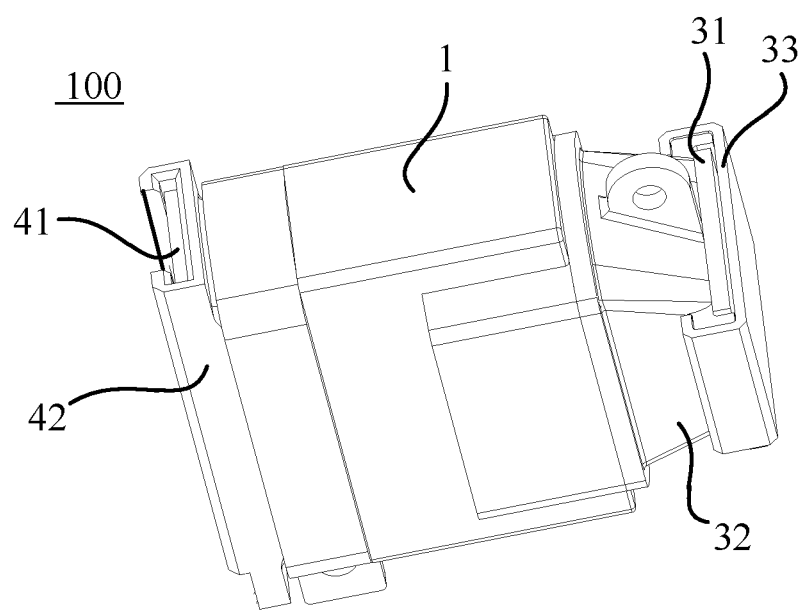
FIG. 2 is a schematic diagram of an optical module in an assembled state, in accordance with some embodiments.

Based on this, some embodiments of the present disclosure provide an optical model 100. FIG. 1 shows a schematic diagram of the optical module 100 in a disassembled state, and FIG. 2 shows a schematic diagram of the optical module 100 in an assembled state. As shown in FIGS. 1 and 2, the optical module 100 includes a lens barrel main housing 1, at least one dimming lens 2, a first cover assembly 3 and a second cover assembly 4.

Figure 3:
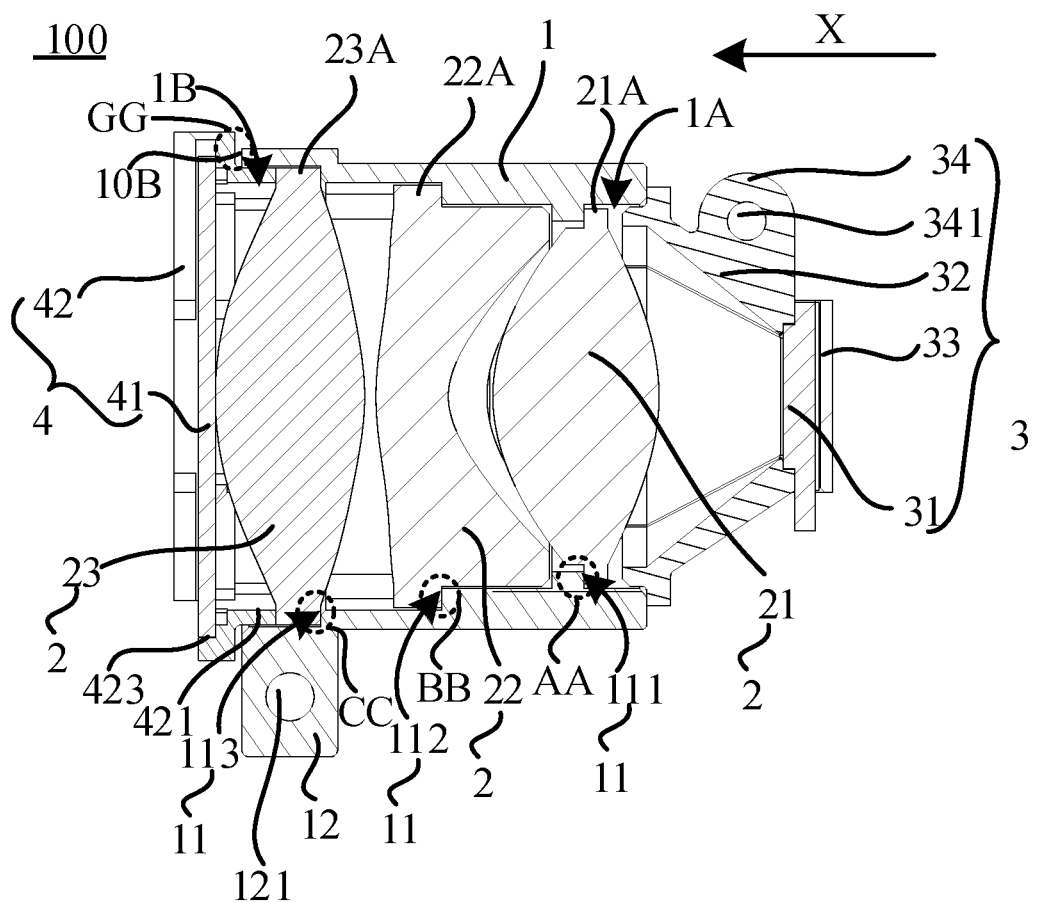
FIG. 3 is a sectional view of an optical module, in accordance with some embodiments.

Referring to FIG. 3, opposite ends of the lens barrel main housing 1 are respectively provided with a first opening 1A and a second opening 1B therein. As shown in FIG. 1, an inner circumferential wall 10 of the lens barrel main housing 1 is provided with at least one limiting portion 11 thereon, and the at least one limiting portion 11 is arranged in a preset direction X. The preset direction X points from one of the first opening 1A and the second opening 1B to another of the first opening 1A and the second opening 1B. In a case where there are a plurality of limiting portions 11, the plurality of limiting portions 11 are sequentially arranged at intervals in the preset direction X. FIG. 3 shows an example in which the preset direction X points from the first opening 1A to the second opening 1B. Here, it will be understood that, in some examples, the preset direction X may point from the second opening 1B to the first opening 1A.

The at least one dimming lens 2 is installed in the lens barrel main housing 1, and each dimming lens 2 abuts against a respective limiting portion 11 in the preset direction X, so that each limiting portion 11 prevents a respective dimming lens 2 from moving toward the first opening 1A or the second opening 1B. In this way, the dimming lens 2 may enter the lens barrel main housing 1 from one of the first opening 1A and the second opening 1B, and abut against the respective limiting portion 11, so as to restrict the movement of the dimming lens 2 from the other of the first opening 1A and the second opening 1B to an outside of the lens barrel main housing 1.

For example, as shown in FIG. 3, the at least one limiting portion 11 includes a first limiting surface 111, a second limiting surface 112 and a third limiting surface 113 that are sequentially away from the first opening 1A. The first limiting surface 111 faces the first opening 1A, the second limiting surface 112 faces the second opening 1B, and the third limiting surface 113 faces the second opening 1B. That is, the first limiting surface 111 is exposed by the first opening 1A, the second limiting surface 112 and the third limiting surface 113 are exposed by the second opening 1B. Correspondingly, as shown in FIG. 3, the at least one dimming lens 2 includes a first dimming lens 21, a second dimming lens 22 and a third dimming lens 23. An edge of the first dimming lens 21 is to provided with a first limiting flange 21A thereon, an edge of the second dimming lens 22 is provided with a second limiting flange 22A thereon, and an edge of the third dimming lens 23 is provided with a third limiting edge 23A thereon. In a case where the first dimming lens 21 enters the lens barrel main housing 1 from the first opening 1A, and the first limiting flange 21A of the first dimming lens 21 abuts against the first limiting surface 111 of the lens barrel main housing 1, the first limiting surface 111 may restrict the movement of the first dimming lens 21 toward the second opening 1B, so as to prevent the first dimming lens 21 from moving from the second opening 1B to the outside of the lens barrel main housing 1. In a case where the second dimming lens 22 enters the lens barrel main housing 1 from the second opening 1B, and the second limiting flange 22A of the second dimming lens 22 abuts against the second limiting surface 112 of the lens barrel main housing 1, the second limiting surface 112 may restrict the movement of the second dimming lens 22 toward the first opening 1A, so as to prevent the second dimming lens 22 from moving from the first opening 1A to the outside of the lens barrel main housing 1. In a case where the third dimming lens 23 enters the lens barrel main housing 1 from the second opening 1B, and the third limiting flange 23A of the third dimming lens 23 abuts against the third limiting surface 113 of the lens barrel main housing 1, the third limiting surface 113 may restrict the movement of the third dimming lens 23 toward the first opening 1A, so as to prevent the third dimming lens 23 from moving from the first opening 1A to the outside of the lens barrel main housing 1.

It is worth noting that, in a case where at least two dimming lenses (e.g., the second dimming lens 22 and the third dimming lens 23) need to enter from the same opening (e.g., the second opening 1B), at least two limiting surfaces (e.g., the second limiting surface 112 and the third limiting surface 113) corresponding to the at least two dimming lenses sequentially expand outward in the preset direction X (e.g., in a direction of the first opening 1A pointing to the second opening 1B. That is, taking a plane perpendicular to the preset direction X as a reference plane, an orthographic projection of the second limiting surface 112 on the reference plane is located within an orthographic projection of the third limiting surface 113 on the reference plane. In this way, the second dimming lens 22 that will abut against the second limiting surface 112 may smoothly pass through the third limiting surface 113. That is, the second dimming lens 22 will not be blocked by the third limiting surface 113, and may abut against the second limiting surface 112 successfully. Afterwards, the third dimming lens 23 may still be put into the lens barrel main housing 1 and abut against the third limiting surface 113.

As shown in FIG. 3, the first cover assembly 3 is disposed on the first opening 1A. The first cover assembly 3 includes a light source 31 configured to emit image beams to the at least one dimming lens 2. The light source 31 may be a display device, for example, a liquid crystal display device, an electroluminescent display device, or a photoluminescence display device. Alternatively, the light source 31 may be a projection device, for example, a projector. It will be noted that, the embodiments are not limited thereto. That is, the light source 31 may be any device that is capable of emitting the image beams.

In addition, the light source 31 is arranged to emit the image beams to the at least one dimming lens 2, so that the image beams may be adjusted by the at least one dimming lens 2. For example, a transmission direction of the image beams may be adjusted by the at least one dimming lens 2; and/or, a contraction angle or a divergence angle of the image beams may be adjusted by the at least one dimming lens 2. In other words, on a basis of a case that the dimming lens(es) 2 may abut against the corresponding limiting portion(s), a structure and shape of each dimming lens 2 may be set according to adjustment requirements of the image beams, and the embodiments do not further limit the structure and shape of the dimming lens 2. For example, as shown in FIG. 3, the first dimming lens 21 may be set as a biconvex lens; the second dimming lens 22 may be set as a meniscus lens, a concave surface of the second dimming lens 22 faces the first opening 1A, and a convex surface of the second dimming lens 22 faces the second opening 1B, and the third dimming lens 23 may be set as a biconvex lens.

As shown in FIG. 3, the second cover assembly 4 is disposed on the second opening 1B. The second cover assembly 4 includes a transparent component 41, and the transparent component 41 is capable of transmitting the image beams passing through the at least one dimming lens 2 to the outside of the lens barrel main housing 1. The transparent component 41 may be made of a transparent material such as glass.

The optical module 100 provided in the embodiments has advantages of a small number of components, a simple whole-structure, accurate positioning, and convenient assembly. Moreover, the assembled optical module 100 has a small volume and a light weigh. In a case where the optical module 100 is installed in an electronic device such as AR glasses, the volume and the weight of the electronic device may be greatly reduced, so that the electronic device has an advantage of being convenient to carry.

In some embodiments, as shown in FIGS. 3, 8A to 8C, the optical module 100 further includes first adhesive(s) 01 each disposed between a dimming lens 2 and a limiting portion 11 that are abutted against each other. For example, as shown in FIG. 3, a first adhesive may be provided between the first limiting flange 21A of the first dimming lens 21 and the first limiting surface 111 of the lens barrel main housing 1, another first adhesive may be provided between the second limiting flange 22A of the second dimming lens 22 and the second limiting surface 112 of the lens barrel main housing 1, and yet another first adhesive may be provided between the third limiting flange 23A of the third dimming lens 23 and the third limiting surface 113 of the lens barrel main housing 1. In this way, the dimming lens 2 and the limiting portion 11 that are abutted against each other may be relatively fixed. For example, the first dimming lens 21 may be fixed on the first limiting surface 111, the second dimming lens 22 may be fixed on the second limiting surface 112, and the third dimming lens 23 may be fixed on the third limiting surface 113. Thus, it may be possible to prevent the dimming lens(es) 2 (e.g., the first dimming lens 21, the second dimming lens 22 and the third dimming lens 23) from shaking relative to the lens barrel main housing 1, which may improve a stability of propagation of the image beams.

For example, the first adhesive disposed between the dimming lens 2 and the limiting portion 11 that are abutted against each other may be an optically clear adhesive such as an ultraviolet (UV) curable adhesive. The UV curable adhesive may be cured under the irradiation of ultraviolet light, so that the dimming lens 2 and the limiting portion 11 that are abutted against each other may be relatively fixed. In addition, the use of the optically clear adhesive may avoid interference to the image beams, which may improve reliability.

Figure 4:
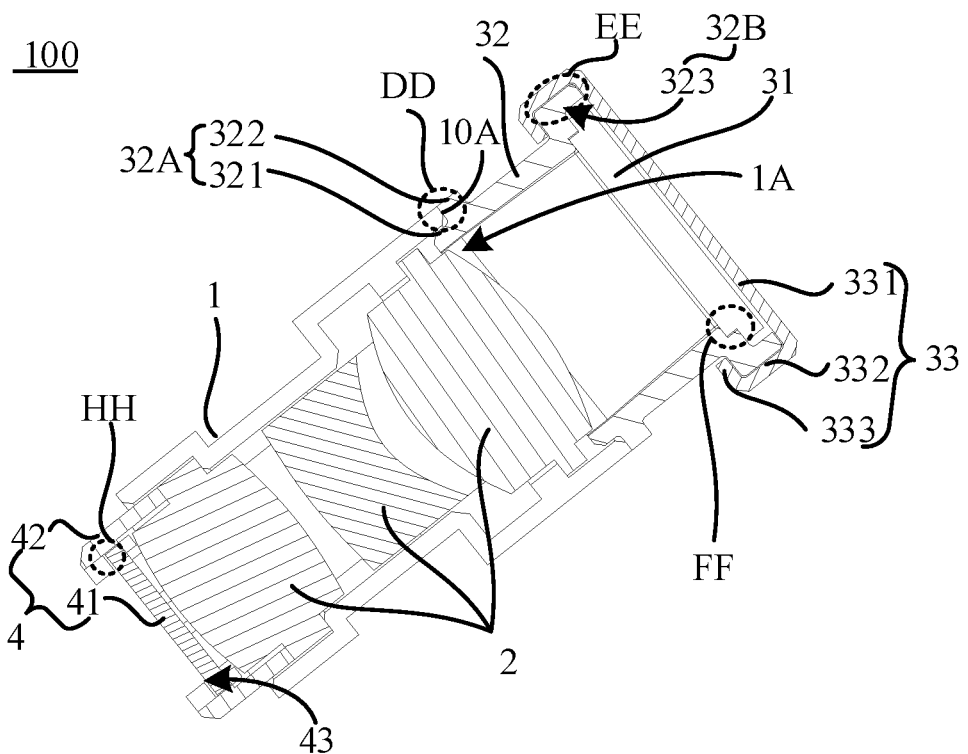
FIG. 4 is another sectional view of an optical module, in accordance with some embodiments.

In some embodiments, as shown in FIG. 4, in addition to the light source 31, the first cover assembly 3 further includes a hollow tubular body 32 and a back cover 33. A first end 32A of the tubular body 32 includes a first portion 321 embedded in the first opening 1A and a second portion 322 abutting against an end surface 10A of the lens barrel main housing 1 at a position of the first opening 1A. In this way, the first portion 321 embedded in the first opening 1A may restrict the movement of the tubular body 32 relative to the lens barrel main housing 1 in a radial direction of the first opening 1A, and the second portion 322 abutting against the end surface of the lens barrel main housing 1 at the position of the first opening 1A may prevent the tubular body 32 from being completely inserted into an inside of the lens barrel main housing 1. As a result, it may be possible to well realize the installation and positioning between the tubular body 32 and the lens barrel main housing 1.

Figure 9:
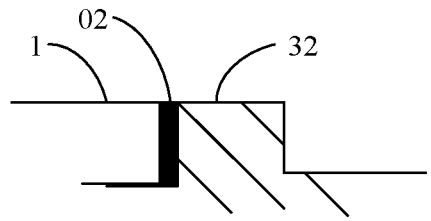
FIG. 9 is a schematic diagram of a second adhesive, in accordance with some embodiments.

For example, as shown in FIGS. 4 and 9, the optical module 100 further includes a second adhesive 02 disposed between the lens barrel main housing 1 and the tubular body 32. The lens barrel main housing 1 and the tubular body 32 may be bonded and fixed by the second adhesive here, so that a connection between the lens barrel main housing 1 and the tubular body 32 may be more reliable. It will be noted that, since it is not directly bonded to a dimming lens, the second adhesive here may be either an optically clear adhesive (e.g., an UV curable adhesive) or other adhesives that have a bonding function such as silica gel.

With continued reference to FIG. 4, for example, an inner side of a second end 32B of the tubular body 32 is provided with a light source installation position 323 for installing the light source 31, and the light source 31 is installed in the light source installation position 323. For example, the light source installation position 323 may be set, as shown in FIG. 4, in a stepped shape, so that the light source 31 may be installed and positioned conveniently. Afterwards, the back cover 33 is connected to the second end of the tubular body 32, so that the light source 31 may be fixed between the back cover 33 and the tubular body 32.

Based on this, for example, as shown in FIG. 4, the back cover 33 includes a back cover body 331, two first extension portions 332 and two second extension portions 333. The two first extension portions 332 extend from opposite ends of the back cover body 331 toward the light source 31 in a direction perpendicular to the back cover body 331, and each second extension portion 333 extends from an end of a first extension portion 332 away from the back cover body 331 toward another first extension portion 332, so that a positioning groove 32C (shown in FIG. 1) may be formed among the second extension portion 333, the first extension portion 332 and the back cover body 331 that are connected. Opposite sides of the second end of the tubular body 32 are each located in a single positioning groove, so that the back cover 33 and the tubular body 32 are clamped and fixed, and thus the light source 31 is confined in the light source installation position 323.

Figure 10:
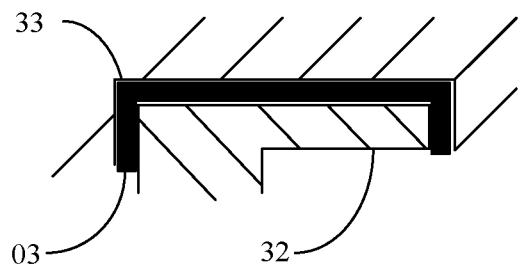
FIG. 10 is a schematic diagram of a third adhesive, in accordance with some embodiments.

For example, as shown in FIGS. 4 and 10, the optical module 100 further includes third adhesive(s) 03 each disposed between the back cover 33 and the tubular body 32. The back cover 33 and the tubular body 32 may be bonded and fixed by the third adhesive here, so that a connection between the back cover 33 and the tubular body 32 may be more reliable. It will be noted that, since it is not directly bonded to the dimming lens, the third adhesive here may be either an optically clear adhesive (e.g., an UV curable adhesive), or other adhesives that have a bonding function such as silica gel.

Figure 11:
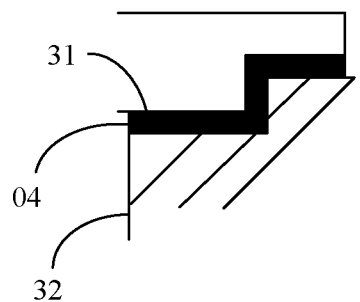
FIG. 11 is a schematic diagram of a fourth adhesive, in accordance with some embodiments.

For example, as shown in FIGS. 4 and 11, the optical module further includes fourth adhesive(s) 04 each disposed between the tubular body 32 and the light source 31. The light source 31 and the tubular body 32 may be bonded and fixed by the fourth adhesive here, so that a connection between the light source 31 and the tubular body 32 may be more reliable. In addition, in order to prevent the fourth adhesive from affecting the image beams emitted by the light source 31, the fourth adhesive here may be set as an optically clear adhesive (e.g., an UV curable adhesive).

In some embodiments, as shown in FIG. 3, the first cover assembly 3 further includes a first fixing plate 34 disposed on an outer surface of the tubular body 32, and the first fixing plate 34 is provided with a first fixing hole 341 therein. And/or, the optical module further includes a second fixing plate 12 disposed on an outer surface of the lens barrel main housing 1, and the second fixing plate 12 is provided with a second fixing hole 121 therein. By arranging the first fixing hole 341 and/or the second fixing hole 121, it may be possible that the optical module 100 after being assembled is conveniently and quickly fixed in the electronic device. For example, the optical module 100 may further include screw(s) or bolt(s). A screw or bolt passes through the first fixing hole 341 and is connected to a body of the electronic device, and/or another screw or bolt passes through the second fixing hole 121 and is connected to the body of the electronic device. As a result, the overall fixation of the optical module 100 may be realized.

In some embodiments, as shown in FIG. 3, in addition to the transparent component 41, the second cover assembly 4 further includes a hollow frame 42. The frame 42 includes a third portion 421 embedded in the second opening 1B and a fourth portion 423 abutting against an end surface 10B of the lens barrel main housing 1 at a position of the second opening 1B. A positioning slide groove 43 is provided in an inner side of the fourth portion 423 (as shown in FIG. 4). As shown in FIG. 1, at least one end of the positioning slide groove 43 in a sliding direction is provided with a third opening 430 therein, and the transparent component 41 is disposed in the positioning slide groove 43.

In the embodiments, the third portion 421 embedded in the second opening 1B may restrict the movement of the frame 42 relative to the lens barrel main housing 1 in a radial direction of the second opening 1B, and the fourth portion 423 abutting against the end surface of the lens barrel main housing 1 at the position of the second opening 1B may prevent the frame 42 from being completely inserted into the inside of the lens barrel main housing 1. As a result, it may be possible to well realizing the installation and positioning between the frame 42 and the lens barrel main housing 1. In addition, by arranging the positioning slide groove 43 provided in the inner side of the fourth portion 423 and the third opening in the at least one end of the positioning slide groove 43 in the sliding direction, it may be possible that the transparent component 41 is conveniently and quickly installed in the positioning slide groove 43.

Figure 12:
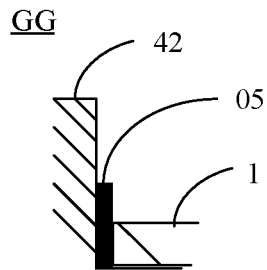
FIG. 12 is a schematic diagram of a fifth adhesive, in accordance with some embodiments.

Based on this, for example, as shown in FIGS. 3 and 12, the optical module 100 further includes fifth adhesive(s) 05 each disposed between the lens barrel main housing 1 and the frame 42. The lens barrel main housing 1 and the frame 42 may be bonded and fixed by the fifth adhesive here, so that a connection between the lens barrel main housing 1 and the frame 42 may be more reliable. It will be noted that, since it is not directly bonded to the dimming lens, the fifth adhesive here may be either an optically clear adhesive (e.g., an UV curable adhesive) or other adhesives that have a bonding function such as silica gel.

Figure 13:
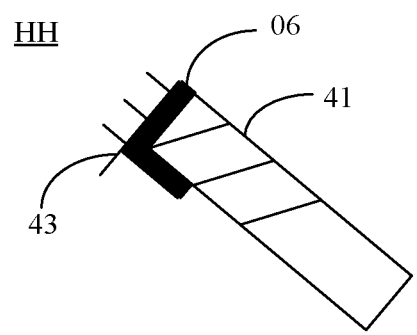
FIG. 13 is a schematic diagram of a sixth adhesive, in accordance with some embodiments.

For example, as shown in FIGS. 4 and 13, the optical module 100 further includes sixth adhesive(s) 06 each disposed between the positioning slide groove 43 and the transparent component 41. The transparent component 41 and the positioning slide groove 43 may be bonded and fixed by the sixth adhesive here, so that a connection between the transparent component 41 and the positioning slide groove 43 may be more reliable. In addition, in order to prevent the sixth adhesive from affecting the image beams passing through the transparent component 41, the sixth adhesive here may be set as an optically clear adhesive (e.g., an UV curable adhesive).

Figure 5:
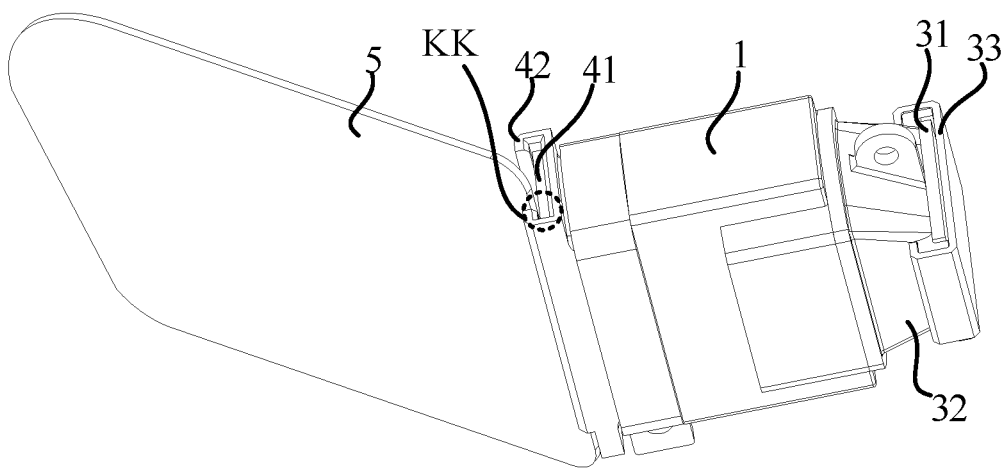
FIG. 5 is a structural diagram of an optical module, in accordance with some embodiments.

In some embodiments, as shown in FIG. 5, the optical module 100 further includes an optical waveguide display lens 5. A side surface of the optical waveguide display lens 5 abuts against the transparent component, so that the image beams may enter the optical waveguide display lens 5 from the side surface of the optical waveguide display lens 5. In this way, an image corresponding to the image beams may be displayed on the optical waveguide display lens, so that an AR display function may be realized. The optical waveguide display lens 5 may has a single-layer structure or a multi-layer structure. In a case where the optical waveguide display lens 5 has the multi-layer structure, pictures with different depths of field may be displayed, so that a three-dimensional stereoscopic display function may be realized.

Figure 14:
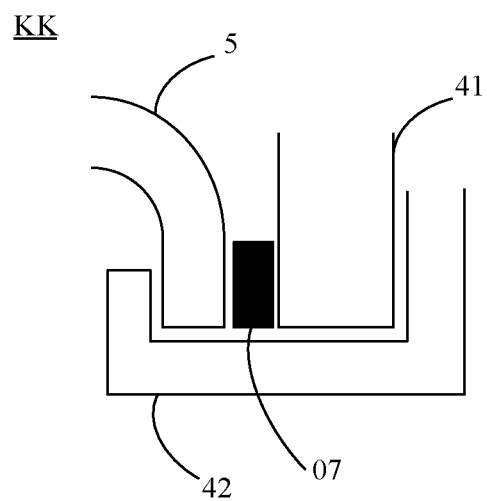
FIG. 14 is a schematic diagram of a seventh adhesive, in accordance with some embodiments.

For example, as shown in FIGS. 5 and 14, the optical module 100 further includes a seventh adhesive 07 disposed between the optical waveguide display lens 5 and the transparent component 41. The optical waveguide display lens 5 and the transparent component 41 may be bonded and fixed by the seventh adhesive here, so that a connection between the optical waveguide display lens 5 and the transparent component 41 may be more reliable. In addition, in order to prevent the seventh adhesive from affecting the image beams, the seventh adhesive may be set as an optically clear adhesive (e.g., an UV curable adhesive).

In addition, in some examples, the transparent component 41, except for a region facing the side surface of the optical waveguide display lens 5, may be coated with a light-shielding adhesive, so that light leakage may be avoided, crosstalk between light rays may be reduced, and the display effect may be improved.

Figure 6:
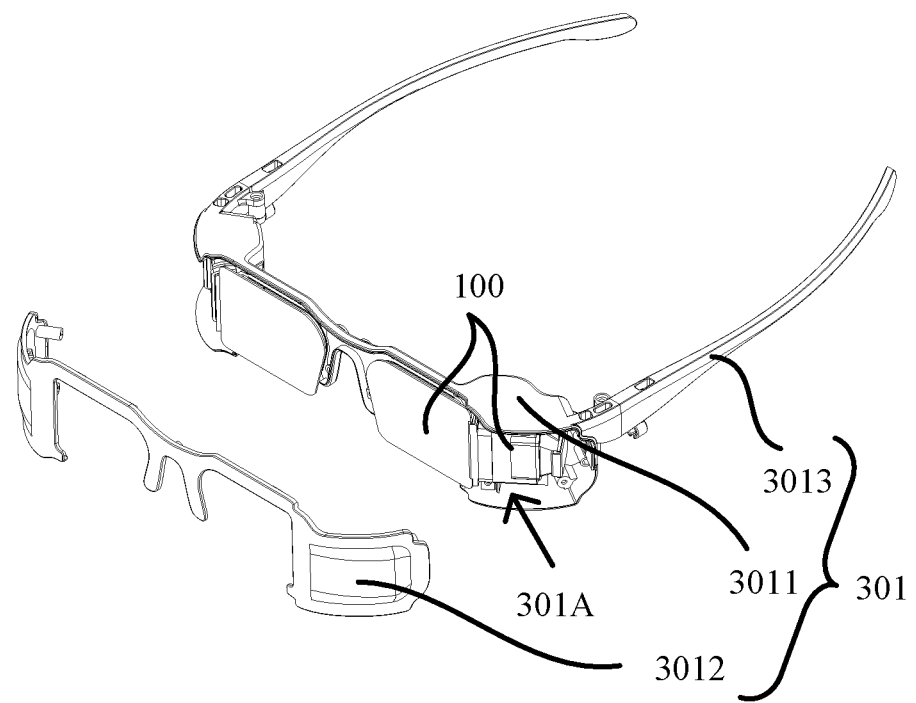
FIG. 6 is a schematic diagram of a pair of glasses in a disassembled state, in accordance with some embodiments.
Figure 7:
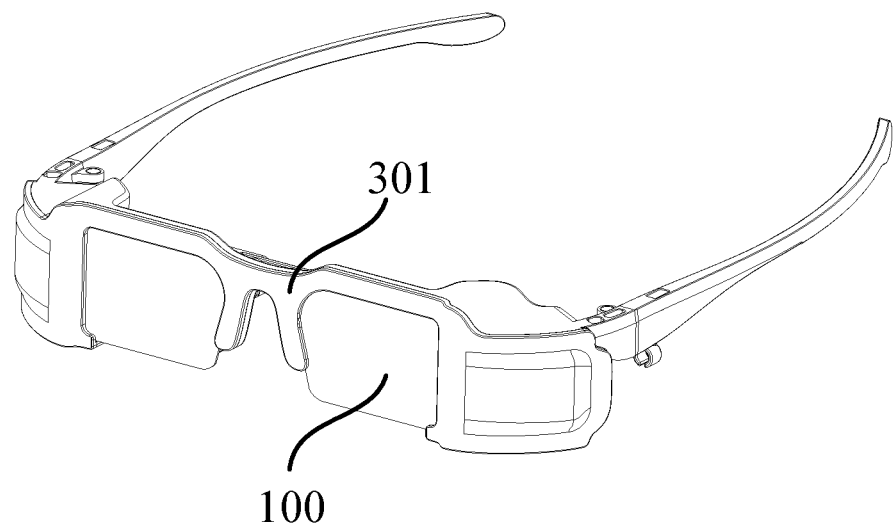
FIG. 7 is a schematic diagram of a pair of glasses in an assembled state, in accordance with some embodiments.
Figure 8A:
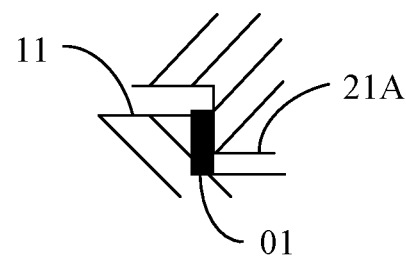
FIG. 8A is a schematic diagram of a first adhesive, in accordance with some embodiments.
Figure 8B:
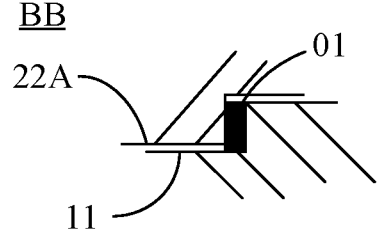
FIG. 8B is a schematic diagram of another first adhesive, in accordance with some embodiments.
Figure 8C:
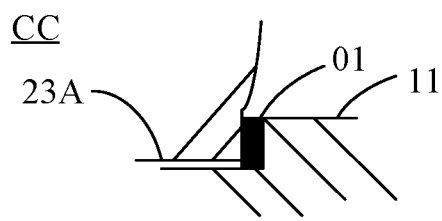
FIG. 8C is a schematic diagram of yet another first adhesive, in accordance with some embodiments.

Some embodiments of the present disclosure further provide an electronic device 200. Referring to FIGS. 6 and 7, the electronic device 200 includes the optical module 100 described in any of the above embodiments. Therefore, the electronic device 200 has all the beneficial effects as described above, which will not be repeated here.

The electronic device may be a display device. For example, the display device may be any product or element having a display function, such as an AR helmet, AR glasses, a mobile phone, a tablet computer, a television, a display, a notebook computer, a digital photo frame, or a navigator.

Some embodiments of the present disclosure further provide glasses 300. The glasses 300 may be AR glasses or VR glasses. As shown in FIGS. 6 and 7, the glasses 300 include a support structure 301 and optical model(s) 100 disposed on the support structure 301.

For example, as shown in FIG. 6, the support structure 301 includes a glasses frame body 3011 and glasses frame upper cover(s) 3012 that match with each other. Receiving space(s) 301A each for accommodating the optical module 100 are defined between the glasses frame body 3011 and the glasses frame upper cover 3012. In addition, the support structure 301 further includes a wearing bracket 3013 connected to the glasses frame body 3011.

As shown in FIGS. 6 and 7, the glasses 300 may include two optical modules 100, and two optical waveguide display lenses of the two optical modules 100 are each located in a respective receiving space. In this case, the two optical waveguide display lenses may correspond to a left eye and a right eye of a human body, respectively. Similarly, the wearing bracket 3013 may include two glasses legs, each of which may be placed on an ear of the human body, so as to realize wearing. In addition, when the glasses 300 is worn, the two optical waveguide display lenses are located on front of the left eye and the right eye of the human body, respectively.

In the embodiments, since the glasses 300 include the optical module 100 described in any of the above embodiments, the glasses 300 have all the beneficial effects of the optical module 100 as described above, which will not be repeated here.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An optical module, comprising:
a lens barrel main housing, opposite ends of the lens barrel main housing being respectively provided with a first opening and a second opening therein; an inner circumferential wall of the lens barrel main housing being provided thereon with at least one limiting portion arranged in a preset direction; the preset direction pointing from one of the first opening and the second opening to another of the first opening and the second opening;
at least one dimming lens installed in the lens barrel main housing, each dimming lens abutting against a respective limiting portion in the preset direction, so that each limiting portion prevents a respective dimming lens from moving toward one of the first opening and the second opening;
a first cover assembly disposed on the first opening; the first cover assembly including a light source, and the light source being configured to emit image beams to the at least one dimming lens; and
a second cover assembly disposed on the second opening; the second cover assembly including a transparent component and a hollow frame body, and the transparent component being capable of transmitting the image beams passing through the at least one dimming lens to an outside of the lens barrel main housing, the frame body including a third portion embedded in the second opening and a fourth portion abutting against another end surface of the lens barrel main housing at a position of the second opening; a positioning slide groove being provided in an inner side of the fourth portion, and at least one end of the positioning slide groove in a sliding direction being provided with a third opening therein; the transparent component being disposed in the positioning slide groove.

2. The optical module according to claim 1, further comprising:
at least one first adhesive disposed between a dimming lens and a respective limiting portion that are abutted against each other.

3. The optical module according to claim 1, wherein the first cover assembly further includes:
a hollow tubular body, a first end of the tubular body including a first portion embedded in the first opening and a second portion abutting against an end surface of the lens barrel main housing at a position of the first opening; an inner side of a second end of the tubular body being provided with a light source installation position for installing the light source; the light source being installed in the light source installation position; and a back cover connected to the second end of the tubular body, so that the light source is fixed between the back cover and the tubular body.

4. The optical module according to claim 3, wherein the light source installation position is in a stepped shape.

5. The optical module according to claim 3, wherein the back cover includes:
a back cover body;
two first extension portions extending respectively from opposite ends of the back cover body toward the light source in a direction perpendicular to the back cover body; and
two second extension portions each extending from an end of a first extension portion away from the back cover body toward another first extension portion, wherein
positioning grooves are each provided among a second extension portion, a first extension portion and the back cover body that are connected, and opposite sides of the second end of the tubular body are each located in a positioning groove.

6. The optical module according to claim 5, further comprising at least one of:
a second adhesive disposed between the tubular body and the lens barrel main housing;
at least one third adhesive disposed between the tubular body and the back cover; or
at least one fourth adhesive disposed between the tubular body and the light source.

7. The optical module according to claim 3, wherein the first cover assembly further includes:
a first fixing plate disposed on an outer surface of the tubular body, the first fixing plate being provided with a first fixing hole therein.

8. The optical module according to claim 1, further comprising:
at least one fifth adhesive disposed between the frame body and the lens barrel main housing; and/or
at least one sixth adhesive disposed between the transparent component and the positioning slide groove.

9. The optical module according to claim 1, wherein the at least one limiting portion includes a first limiting surface, a second limiting surface and a third limiting surface that are away from the first opening in sequence; the first limiting surface is exposed by the first opening, and the second limiting surface and the third limiting surface are exposed by the second opening; and
the at least one dimming lens includes a first dimming lens, a second dimming lens and a third dimming lens; an edge of the first dimming lens is provided thereon with a first limiting flange abutting against the first limiting surface, an edge of the second dimming lens is provided thereon with a second limiting flange abutting against the second limiting surface, and an edge of the third dimming lens is provided thereon with a third limiting flange abutting against the third limiting surface.

10. The optical module according to claim 9, wherein the first dimming lens is a biconvex lens; and/or
the second dimming lens is a meniscus lens, a concave surface of the second dimming lens facing the first opening, and a convex surface of the second dimming lens facing the second opening; and/or
the third dimming lens is another biconvex lens.

11. The optical module according to claim 1, further comprising:

a second fixing plate disposed on an outer surface of the lens barrel main housing, the second fixing plate being provided with a second fixing hole therein.

12. The optical module according to claim 1, further comprising:
an optical waveguide display lens, a side surface of the optical waveguide display lens abutting against the transparent component, so that the image beams enter the optical waveguide display lens from the side surface of the optical waveguide display lens.

13. The optical module according to claim 12, further comprising:
a seventh adhesive disposed between the optical waveguide display lens and the transparent component.

14. The optical module according to claim 1, wherein the light source includes a display device or a projection device.

15. An electronic device, comprising:
at least one optical module according to claim 1.

16. Glasses, comprising:
a support structure; and
at least one optical module according to claim 1 installed on the support structure.

17. The glasses according to claim 16, wherein the support structure includes:
a glasses frame body and at least one glasses frame upper cover that match with each other, and at least one receiving space for accommodating an optical module being defined between the glasses frame body and a glasses frame upper cover; and
a wearing bracket connected to the glasses frame body.

18. The optical module according to claim 1, wherein the at least one limiting portion includes a plurality of limiting portions, and the plurality of limiting portions are arranged at intervals in sequence in the preset direction.

* * * * *